United States Patent
Jarvo et al.

(10) Patent No.: US 12,180,901 B2
(45) Date of Patent: Dec. 31, 2024

(54) METHOD AND SYSTEM FOR OPERATING AN AIRCRAFT POWERPLANT

(71) Applicant: PRATT & WHITNEY CANADA CORP., Longueuil (CA)

(72) Inventors: James Robert Jarvo, Saint-Bruno-de-Montarville (CA); Kenneth Matheson, Montreal (CA); Mario Guerra, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 669 days.

(21) Appl. No.: 16/713,226

(22) Filed: Dec. 13, 2019

(65) Prior Publication Data

US 2021/0102504 A1    Apr. 8, 2021

Related U.S. Application Data

(60) Provisional application No. 62/910,681, filed on Oct. 4, 2019.

(51) Int. Cl.
| | |
|---|---|
| *F02C 9/58* | (2006.01) |
| *B64C 11/44* | (2006.01) |
| *B64D 27/10* | (2006.01) |
| *B64D 31/04* | (2006.01) |
| *B64D 31/06* | (2006.01) |

(52) U.S. Cl.
CPC ........... *F02C 9/58* (2013.01); *B64C 11/44* (2013.01); *B64D 27/10* (2013.01); *B64D 31/04* (2013.01); *B64D 31/06* (2013.01)

(58) Field of Classification Search
CPC ... F02C 9/58; F02C 9/42; B64C 11/44; B64D 27/10; B64D 31/04; B64D 31/06; B64D 31/10; F05D 2270/02; F02D 29/02
See application file for complete search history.

(56) References Cited

U.S. PATENT DOCUMENTS

| | | | | |
|---|---|---|---|---|
| 2,640,550 A | * | 6/1953 | Knapp | F02C 9/58 416/35 |
| 2,667,228 A | * | 1/1954 | Wood | F02C 9/58 416/36 |
| 2,737,252 A | * | 3/1956 | Knapp | F02C 9/58 416/37 |

(Continued)

FOREIGN PATENT DOCUMENTS

EP    3543112 A1    9/2019

*Primary Examiner* — Christopher D Hutchens
(74) *Attorney, Agent, or Firm* — Norton Rose Fulbright Canada LLP

(57) ABSTRACT

Methods and system are described for operating an aircraft powerplant comprising an engine coupled to a variable-pitch propeller. The method comprises receiving a request to change a propeller rotational speed from a first setting to a second setting, determining a power need for the engine, when the power need corresponds to the second setting, modifying a command for at least one of fuel flow to the engine and oil flow to the propeller to govern the powerplant in accordance with the second setting for the propeller rotational speed, and when the power need does not correspond to the second setting, overriding the request to change the propeller rotational speed from the first setting to the second setting.

17 Claims, 7 Drawing Sheets

(56) References Cited

U.S. PATENT DOCUMENTS

| | | | | |
|---|---|---|---|---|
| 2,931,442 | A * | 4/1960 | Francis | F02C 9/28 |
| | | | | 416/37 |
| 4,648,797 | A * | 3/1987 | Martin | F02C 9/28 |
| | | | | 416/27 |
| 4,958,289 | A * | 9/1990 | Sum | B64C 11/305 |
| | | | | 701/99 |
| 6,748,744 | B2 | 6/2004 | Peplow et al. | |
| 9,157,377 | B2 | 10/2015 | Lickfold et al. | |
| 2010/0080704 | A1* | 4/2010 | Serven | F02C 9/58 |
| | | | | 416/140 |
| 2011/0190966 | A1 | 8/2011 | Bollen et al. | |
| 2016/0229547 | A1* | 8/2016 | Fisher | F04D 29/325 |
| 2017/0101938 | A1* | 4/2017 | Lescher | F02C 3/10 |
| 2018/0045123 | A1* | 2/2018 | Liacu | F02C 9/58 |
| 2021/0102504 | A1* | 4/2021 | Jarvo | B64D 31/04 |

\* cited by examiner

METHOD AND SYSTEM FOR OPERATING AN AIRCRAFT POWERPLANT

CROSS-REFERENCE TO RELATED APPLICATIONS

The present application claims the benefit of U.S. Provisional Patent Application No. 62/910,681 filed on Oct. 4, 2019, the contents of which are hereby incorporated by reference.

TECHNICAL FIELD

The present disclosure relates generally to aircraft powerplant control and more particularly, to control of a propeller for an aircraft powerplant having an engine and a propeller.

BACKGROUND OF THE ART

Constant speed propellers are controlled by varying the blade angles to maintain the speed of the propeller at a given propeller rotational speed, sometimes referred to as a reference speed. The reference speed is determined during a design phase of the propeller and set to a value that will produce a desired thrust for a given engine operating point.

SUMMARY

In one aspect, there is provided a method for operating an aircraft powerplant comprising an engine coupled to a variable-pitch propeller. The method comprises receiving a request to change a propeller rotational speed from a first setting to a second setting, determining a power need for the engine, when the power need corresponds to the second setting, modifying a command for at least one of fuel flow to the engine and oil flow to the propeller to govern the powerplant in accordance with the second setting for the propeller rotational speed, and when the power need does not correspond to the second setting, overriding the request to change the propeller rotational speed from the first setting to the second setting.

In another aspect, there is provided a system for operating an aircraft powerplant comprising an engine coupled to a variable-pitch propeller. The system comprises a processing unit and a non-transitory computer-readable memory having stored thereon program instructions. The program instructions are executable by the processing unit for receiving a request to change a propeller rotational speed from a first setting to a second setting, determining a power need for the engine, when the power need corresponds to the second setting, modifying a command for at least one of fuel flow to the engine and oil flow to the propeller to govern the powerplant in accordance with the second setting for the propeller rotational speed, and when the power need does not correspond to the second setting, overriding the request to change the propeller rotational speed from the first setting to the second setting.

In yet another aspect, there is provided an aircraft powerplant comprising a gas turbine engine, a variable-pitch propeller coupled to the gas turbine engine, and a controller coupled to the gas turbine engine and the variable-pitch propeller. The controller is configured for receiving a request to change a propeller rotational speed from a first setting to a second setting, determining a power need for the engine, when the power need corresponds to the second setting, modifying a command for at least one of fuel flow to the engine and oil flow to the propeller to govern the powerplant in accordance with the second setting for the propeller rotational speed, and when the power need does not correspond to the second setting, overriding the request to change the propeller rotational speed from the first setting to the second setting.

BRIEF DESCRIPTION OF THE DRAWINGS

Reference is now made to the accompanying FIGS. in which.

It will be noted that throughout the appended drawings, like features are identified by like reference numerals.

DETAILED DESCRIPTION

Figure 1:
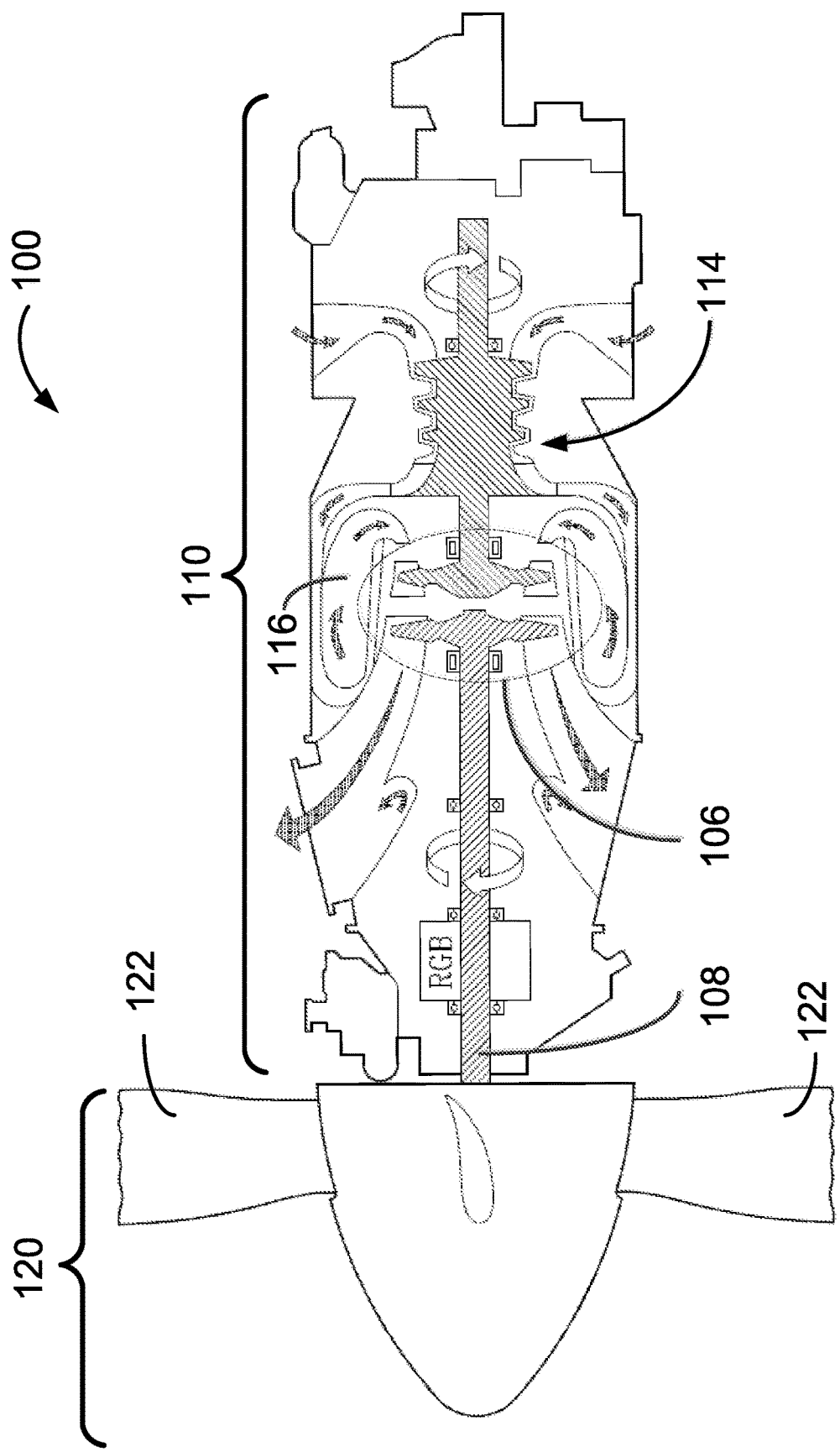
FIG. 1 is a schematic of an example gas turbine engine and propeller, in accordance with one or more embodiments.

FIG. 1 illustrates a powerplant 100 for an aircraft of a type preferably provided for use in subsonic flight, generally comprising an engine 110 and a propeller 120. The powerplant 100 generally comprises in serial flow communication the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases driving the rotation of the propeller through shaft 108. The propeller 120 converts rotary motion from the shaft 108 of the engine 110 to provide propulsive force for the aircraft, also known as thrust. The propeller 120 is a variable-pitch propeller capable of generating forward and reverse thrust. The propeller 120 comprises two or more propeller blades 122. A blade angle of the propeller blades 122 may be adjusted. The blade angle may be referred to as a beta angle, an angle of attack or a blade pitch. The powerplant 100 may be implemented to comprise a single or multi-spool gas turbine engine, where the turbine section 106 is typically connected to the propeller 120 through a reduction gearbox (RGB).

Figure 2A:
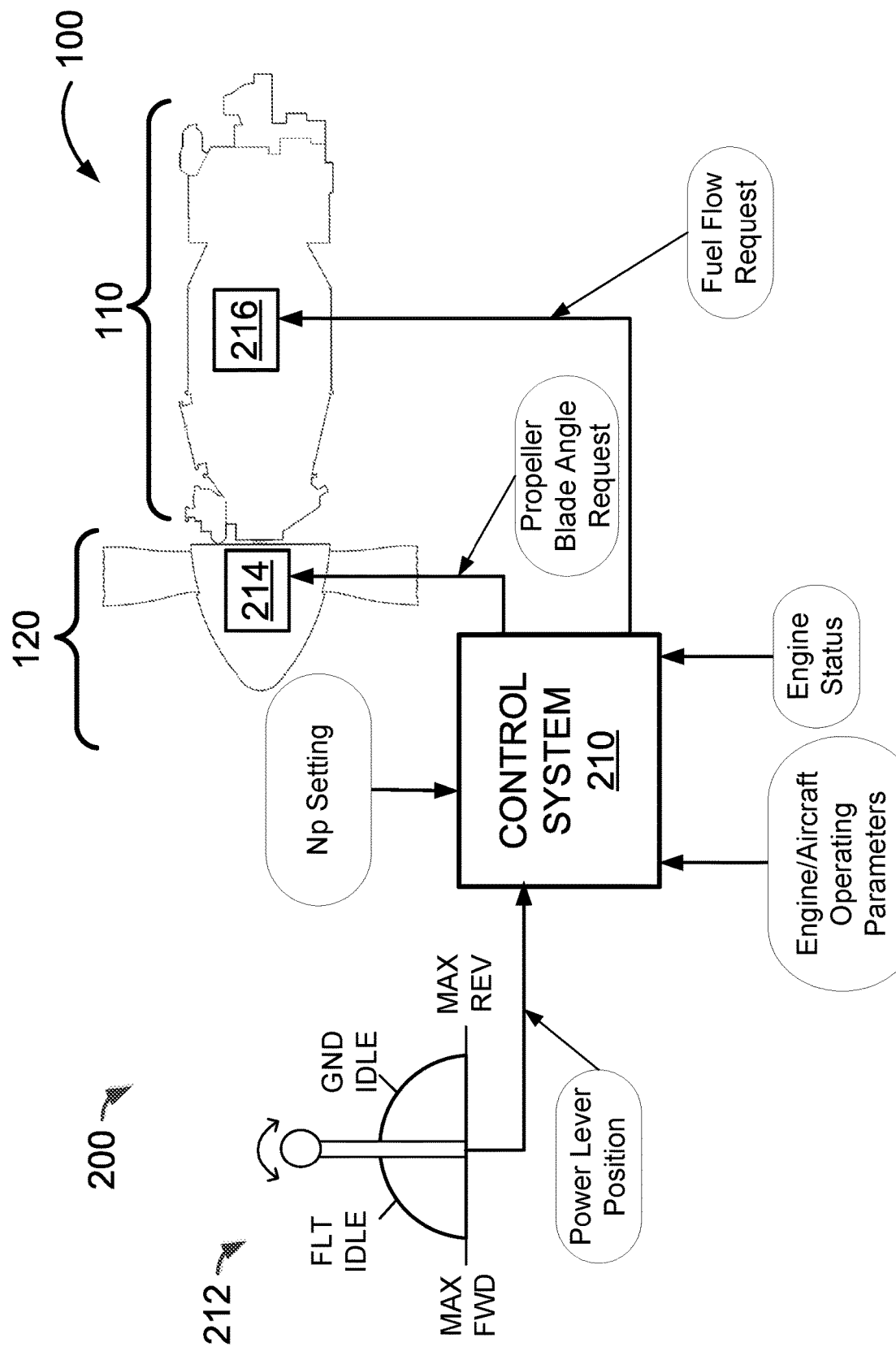
FIG. 2A is a schematic diagram illustrating a system for controlling operation of an aircraft powerplant, in accordance with one or more embodiments.

With reference to FIG. 2A, there is illustrated a system 200 for operating the powerplant 100. A control system 210 receives a power lever or throttle position from a power lever 212 of the aircraft under control by a pilot or other operator of the aircraft. The power lever position is indicative of the type of thrust demanded by the power lever 212. Several power lever positions can be selected, including those for (1) maximum forward thrust (MAX FWD), which is typically used during takeoff; (2) flight idle (FLT IDLE), which may be used in flight during approach or during taxiing on the ground; (3) ground idle (GND IDLE), at which the propeller 120 is spinning, but providing very low thrust; (4) maximum reverse thrust (MAX REV), which is typically used at landing in order to slow the aircraft. Intermediate positions between the abovementioned positions can also be selected. The power lever positions may vary depending on practical implementations of the power lever 212.

The control system 210 may also receive other inputs, such as engine and/or aircraft operating parameters. Example engine operating parameters may include, but are not limited to, inter-turbine temperature, inlet pressure, shaft rotational speed, and engine torque. Example aircraft operating parameters may include, but are not limited to, airspeed, outside air temperature, altitude, aircraft configuration, and aircraft status (ex. in-flight, on-ground, etc).

In general, the control system 210 is configured to control the engine 110 and the propeller 120 based on the received inputs. The control system 210 controls the engine 110 by outputting a fuel flow request to an engine actuator 216 for adjusting engine fuel flow and controls the propeller 120 by outputting a propeller blade angle request to a propeller actuator 214 for adjusting the blade angle of the propeller 120. The engine actuator 216 and/or propeller actuator 214 may each be implemented as a torque motor, a stepper motor, or any other suitable actuator. The engine actuator 216 may be implemented as one or more valves that regulate fuel flow from a fuel source to the engine 110. The control system 210 determines the fuel flow request for adjusting engine fuel flow and the propeller blade angle request for adjusting the blade angle of the propeller 120 based on the received inputs. The propeller actuator 214 may control hydraulic oil pressure to adjust the blade angle based on the propeller blade angle request. In some embodiments, the propeller blade angle request is an oil flow request to set the propeller blade angle. The engine actuator 216 can adjust the fuel flow to the engine 110 based on the fuel flow request.

While the engine actuator 216 and the propeller actuator 214 are illustrated as being part of the engine 110 and the propeller 120, respectively, it should be understood that this is for illustrative purposes only and that the engine actuator 216 and/or the propeller actuator 214 may, in some embodiments, be separate from the powerplant 100. While the controller 210 is illustrated as separate from the powerplant 100, it should be understood that this is for illustrative purposes only and that the controller 210 may, in some embodiments, be integrated with the powerplant 100.

The control system 210 is configured to operate the powerplant 210 in accordance with a variable propeller rotational speed (Np). That is to say, two or more Np values or settings may be used to govern the propeller 120 and/or the engine 110. The control system 210 senses the speed of the aircraft and changes the propeller blade angle to maintain Np in accordance with a given Np setting. Fuel flow may also be varied in order to maintain Np in accordance with the given Np setting.

A request to change the Np setting may be received at the control system 210. In some embodiments, the Np setting is received as a cockpit input, for example from a pilot or other operator of the aircraft. It may be received in-flight or on the ground. The Np setting may come from a switch having two positions, a first position corresponding to a first Np setting and a second position corresponding to a second Np setting. The Np setting may come from a dial having a plurality of positions, each position corresponding to a different Np setting. The Np setting may come from a keypad or other form of live entry whereby a value for Np may be entered and transmitted to the control system 210.

In some embodiments, the Np setting varies as a function of engine and/or aircraft parameters. A change in the engine and/or aircraft parameters causes a change in the Np setting. In some embodiments, the control system 210 receives the engine and/or aircraft parameters and determines a suitable Np setting. In some embodiments, the control system 210 receives the Np setting that has been determined as a function of the engine and/or aircraft parameters by another system for example an aircraft computer.

In some embodiments, an initial Np setting corresponds to a maximum Np and any other setting for Np is lower than the maximum Np. Alternatively, the initial Np setting falls inside a range of Np values and the other Np settings may be above or below the initial setting, within the range of Np values.

In some embodiments the change to the Np setting is caused by the pilot selecting a given power level through the power lever 212. For example, the powerplant 100 may be governed using a maximum Np setting for take-off and a lower Np setting for cruise. If the pilot selects take-off power through the power lever 212 while the aircraft is in cruise, the control system 210 may be configured to change the Np setting to a maximum such that the powerplant 100 can operate at its take-off design point, thus providing additional engine power.

Once a request to change the Np setting is received or a change is determined in accordance with a change in one or more engine/aircraft parameters, the control system 210 is configured to modify at least one of fuel flow to the engine 110 and blade pitch of the propeller 120 in order to change the rotational speed of the propeller 120 and govern the propeller 120 in accordance with the new Np setting.

In some embodiments, a change to the rotational speed of the propeller 120 may have an impact on engine power and certain accommodations may be required in order to compensate the effect on the engine. For example, an increase or decrease in fuel flow may be required to maintain engine power to a desired level if the propeller speed changes and the engine power should remain the same. The control system 210 may thus be configured to effect control over fuel flow and blade pitch in response to a request for a change in Np.

In some embodiments, the control system 210 is configured to evaluate certain parameters before governing the propeller 120 in accordance with a new Np setting. In other words, the control system 210 determines a power need for the engine before responding to the request to govern the propeller 120 in accordance with a new Np setting. For example, engine status may be considered and an incompatible engine status with a requested Np setting may cause the request to be overridden and the actual Np setting maintained. This may occur, for example, if the aircraft is a twin engine and the two engines are not operating at a same speed. In another example, a power lever 212 position may be considered and an incompatible position of the power lever 212 with a requested Np setting may cause the request to be overridden and the actual Np setting to be maintained. This may occur, for example, if the power lever 212 is in a position requiring a large amount of power and the Np request is for a value that is lower than what is required. Other scenarios may apply. Therefore, when the power need of the engine corresponds to the new Np setting, the control system 210 will govern the powerplant 100 in accordance with the new Np setting. When the power need of the engine does not correspond to the new Np setting, the control system 210 will override the request to change the propeller rotational speed to the new Np setting. It will be understood that considerations of a power need include considering possible limitations associated with a new NP setting. For example, if a reduction in propeller speed request would result in a torque above a specified limit, the control system 210 may reduce power to ensure limits are respected.

Figure 2B:
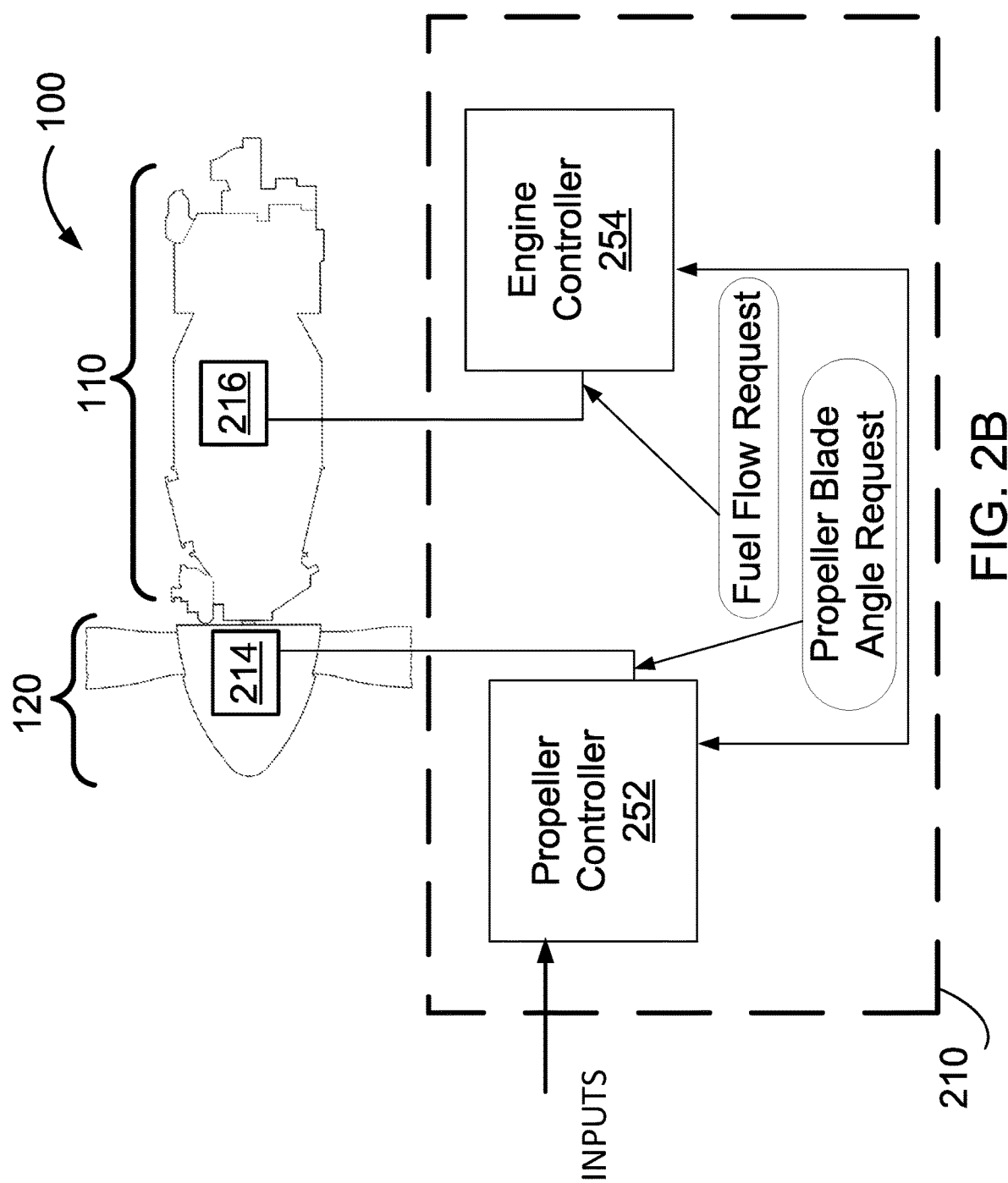
FIG. 2B is a schematic diagram illustrating an example control system, in accordance with one or more embodiments.

With reference to FIG. 2B, the control system 210 is illustrated in accordance with one or more embodiments. A propeller controller 252 controls the propeller 120 and an engine controller 254 controls the engine 110. The propeller controller 252 determines and outputs the propeller blade angle request and the engine controller 254 determines and outputs the fuel flow request. The propeller controller 252 receives the inputs (e.g., Np setting, power lever position, blade angle, aircraft status, forward airspeed and/or any other suitable inputs) and is in electronic communication with the engine controller for providing one or more of the received inputs to the engine controller 254. In some embodiments, the engine controller 254 additionally or alternatively receives the inputs (e.g., the Np setting, power lever position, blade angle, aircraft status, forward airspeed and/or any other suitable inputs). In some embodiments, the engine controller 254 provides one or more of the received inputs to the propeller controller 252. In some embodiments, the propeller controller 252 may determine the blade angle of the propeller 120 and provide the blade angle to the engine controller 254.

Figure 2C:
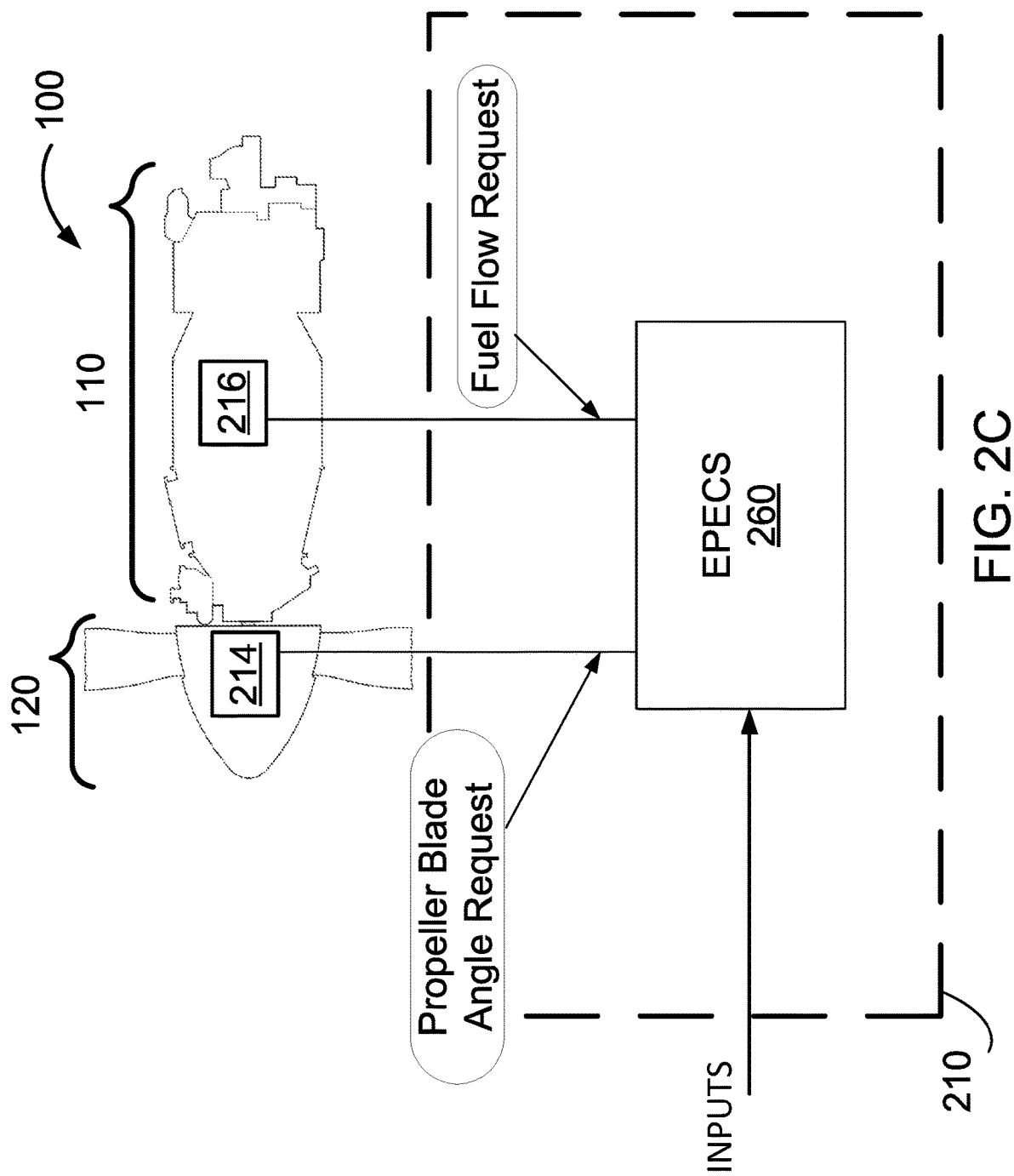
FIG. 2C is a schematic diagram illustrating another example control system, in accordance with one or more embodiments.

In some embodiments, the functionalities of the propeller controller 252 and the engine controller 254 may be implemented in a single controller, for example as an electronic propeller and engine control system (EPECS) 260, as illustrated in FIG. 2C. Having an integrated control system, such as the EPECS 260, to operate the powerplant 100 with variable Np greatly simplifies the control system 210. Operation of the engine 110 and the propeller 120 is integrated and more flexibility is provided. Engine power and propeller rotational speed are both set and controlled within a single control architecture. Features such as considering power lever position or engine status for the Np setting are feasible without requiring complex communication hardware and software between multiple systems. Accommodation control logic such as defaulting to a given Np setting in certain circumstances and compensating for an impact on engine power when changing Np is also simplified and more features may be provided. Failure modes may also be provided, such as defaulting to max Np on one propeller when a failure is detected on another propeller in a twin engine configuration.

Figure 3A:
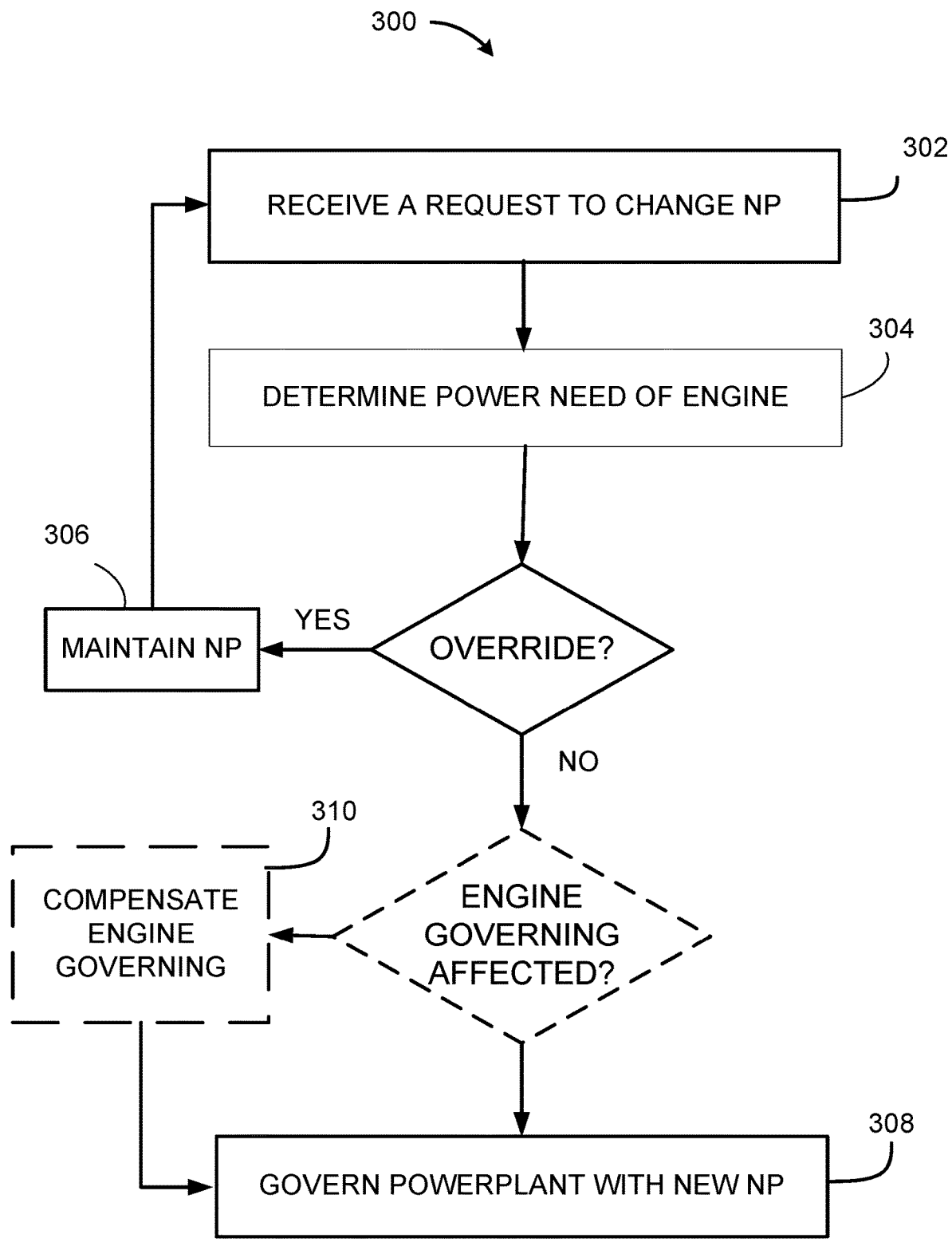
FIGS. 3A-3B are flowcharts of methods for controlling operation of an aircraft powerplant, in accordance with two embodiments.

With reference to FIG. 3A, there is illustrated a flowchart of a method 300 for operating a powerplant, such as the powerplant 100. The method 300 may be performed by the control system 210, the engine controller 254, propeller controller 252 the EPECS 260, or a combination thereof.

At step 302, a request to change Np from a first value to a second value, or from a first setting to a second setting, is received. The request may be received from a cockpit input or from another aircraft/engine system. The request may also be received from another software or hardware module within the control system 210. For example, the request may be received in response to the control system 210 detecting a predetermined engine health status or a predetermined power lever position which would require a default setting for Np, such as maximum Np. Other embodiments may also apply.

At step 304, a power need for the engine is determined. For example, an engine status and/or engine/aircraft parameters are considered to determine if the newly requested Np corresponds to an actual need of the engine. If the request to change Np is to be overridden, a current setting for Np is maintained at step 306. If overriding is not required, the powerplant 100 may be governed in accordance with the new NP setting at step 308. An example where the request for Np would be overridden is if the pilot requests a change in Np that would lower the Np while the power lever is in a position for take-off power, which requires a maximum propeller speed. Another example is if a failure is detected is one engine, the other engine would default to maximum propeller speed (for a twin engine application).

In some embodiments, engine governing may be compensated at step 310 in circumstances where the change in Np affects engine power or other engine governing parameters. Step 310 may be omitted from the method 300. In some embodiments, step 310 is performed when the request to change Np is received in response to a predetermined engine/aircraft status, or in response to a predetermined set of engine/aircraft operating conditions. For example, if a pilot requests take-off power while in cruise mode through the position lever, this may cause the Np to change and engine governing to be compensated as per step 310 if it is intended to maintain an engine speed. Other scenarios may apply.

Governing the powerplant with the new Np, as per step 308, in response to a request to change the Np, comprises modifying at least one of fuel flow to the engine and blade pitch of the propeller. Modifying the blade pitch can speed up or slow down the propeller, as can modifying the fuel flow. In some embodiments, a combination of fuel flow and blade pitch changes are used to adjust the propeller rotational speed to the new Np setting. In some embodiments, propeller governing is fully integrated with engine governing and therefore a change to the Np setting will result in a coordinated approach between fuel flow regulation and blade pitch position.

Figure 3B:
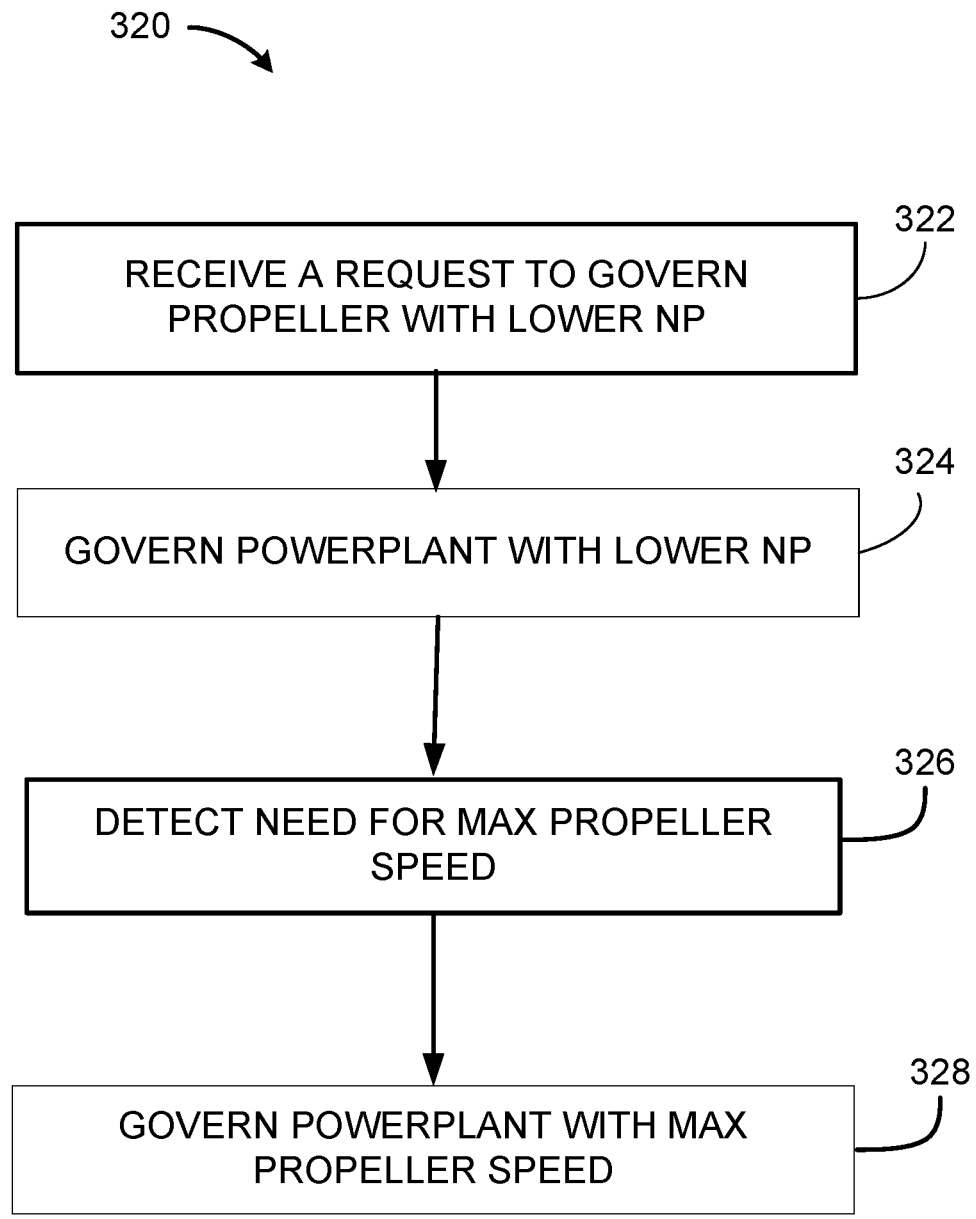

With reference to FIG. 3B, there is illustrated another method 320 for operating the aircraft powerplant 100. The method 320 may be performed by the control system 210, the engine controller 254, propeller controller 252 the EPECS 260, or a combination thereof.

At step 322, a request to govern the propeller 120 with a lower Np is received. The request may be received from a cockpit input or from another aircraft/engine system. The request may also be received from another software or hardware module within the control system 210. At step 324, the powerplant 100 is governed with the lower Np. At step 326, a need for maximum propeller speed is detected. For example, the pilot may have moved the power lever to a take-off position, or a failure in one of the engines of the aircraft may be detected. In response, the powerplant 100 is governed with maximum propeller speed at step 328, despite the current setting for Np. The control system 210 is configured to default to maximum propeller speed when needed, thus overriding any pilot-commanded propeller speed setting.

The control system 210 may be configured to perform method 300, method 320, and/or a combination thereof. In some embodiments, the power need of the engine is assessed at the time a request for a new Np is received (as per step 304 of method 300), for example when the new Np is lower than a maximum propeller speed. If the power need corresponds to the new Np, the powerplant is governed with the new Np (as per step 308 of method 200). If a need for maximum propeller speed is detected at any time while the powerplant is governed with the new Np (as per step 326 of method 320), the control system 210 defaults to maximum propeller speed and governs accordingly (as per step 328 of method 320).

Figure 4:
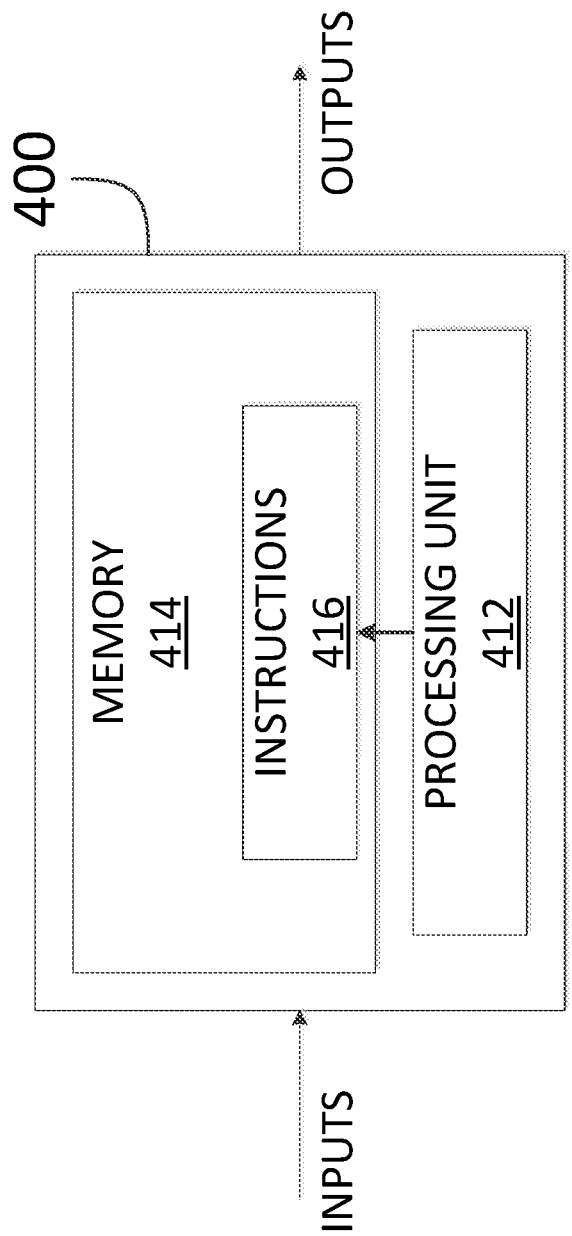
FIG. 4 is a block diagram of an example computing device for controlling operation of an aircraft powerplant, in accordance with one or more embodiments.

With reference to FIG. 4, an example of a computing device 400 is illustrated. The control system 210 may be implemented with one or more computing devices 400. For example, each of the propeller controller 252 and the engine controller 254 may be implemented by a separate computing device 400, or the EPECS 260 may be implemented with a computing device 400. The computing device 400 comprises a processing unit 412 and a memory 414 which has stored therein computer-executable instructions 416. The processing unit 412 may comprise any suitable devices configured to implement the method(s) 300, 320 such that instructions 416, when executed by the computing device 400 or other programmable apparatus, may cause the functions/acts/steps performed as part of the method(s) 300, 320 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the computing device 400 can be implemented as part of a full-authority digital engine controls (FADEC) or other similar device, including electronic engine control (EEC), engine control unit (ECU), electronic propeller control, propeller control unit, and the like.

The methods and systems for operating a powerplant described herein may be implemented in a high level procedural or object oriented programming or scripting language, or a combination thereof, to communicate with or assist in the operation of a computer system, for example the computing device 400. Alternatively, the methods and systems for operating a powerplant may be implemented in assembly or machine language. The language may be a compiled or interpreted language. Program code for implementing the methods and systems for operating a powerplant may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating a powerplant may also be considered to be implemented by way of a non-transitory computer-readable storage medium having a computer program stored thereon. The computer program may comprise computer-readable instructions which cause a computer, or more specifically the processing unit 412 of the computing device 400, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, changes may be made to the engine operating parameters and/or aircraft operating parameters received by the control system, to the number of propeller rotational speed settings available, and the like. Yet further modifications could be implemented by a person of ordinary skill in the art in view of the present disclosure, which modifications would be within the scope of the present technology.

The invention claimed is:

1. A method for operating an aircraft powerplant comprising an engine coupled to a variable-pitch propeller, the method comprising:
   receiving, from a pilot of the aircraft, an input indicative of thrust demanded from the powerplant, the input including a position of a power lever;
   operating the powerplant according to the input indicative of thrust demanded from the powerplant and according to a first setting for a propeller rotational speed;
   receiving, from the pilot of the aircraft via a cockpit input other than the position of the power lever, a pilot request to change the propeller rotational speed from the first setting to a second setting while the powerplant is operated according to the input indicative of thrust demanded from the powerplant;
   determining a power need for the engine based on the input indicative of thrust demanded from the powerplant;
   determining whether the power need is compatible with the second setting for the propeller rotational speed;
   when the power need is compatible with the second setting for the propeller rotational speed, modifying a command for at least one of fuel flow to the engine and oil flow to the propeller to govern the powerplant in accordance with the second setting for the propeller rotational speed; and
   when the power need is incompatible with the second setting for the propeller rotational speed, overriding the pilot request to change the propeller rotational speed from the first setting to the second setting by maintaining the first setting for the propeller rotational speed despite the pilot request to change the propeller rotational speed from the first setting to the second setting;
   wherein:
      the second setting for the propeller rotational speed is lower than a maximum propeller rotational speed;
      the engine is a first engine and the variable-pitch propeller is a first variable-pitch propeller;

the aircraft has a twin engine configuration including a second engine coupled to a second variable-pitch propeller; and the method includes:
when a failure of the second engine is detected while the powerplant is governed in accordance with the second setting for the propeller rotational speed, governing the powerplant in accordance with the maximum propeller rotational speed for the first variable-pitch propeller; and when the pilot selects take-off power through the power lever while the powerplant is governed in accordance with the second setting during cruise, causing, by a control system of the aircraft, the powerplant to be governed in accordance with the maximum propeller rotational speed for the first variable-pitch propeller.

2. The method of claim 1, wherein receiving the pilot request to change the propeller rotational speed comprises receiving the pilot request in-flight.

3. The method of claim 1, wherein receiving the pilot request to change the propeller rotational speed comprises receiving the pilot request at a combined electronic propeller and engine control system.

4. The method of claim 1, wherein determining the power need for the engine comprises obtaining an engine status, and wherein the power need is incompatible with the second setting when the engine status is incompatible with governing the powerplant in accordance with the second setting for the propeller rotational speed.

5. The method of claim 1, wherein the power need is incompatible with the second setting when the position of the power lever is incompatible with governing the powerplant in accordance with the second setting for the propeller rotational speed.

6. The method of claim 1, further comprising modifying the fuel flow to the engine to maintain engine power when the powerplant is governed in accordance with the second setting for the propeller rotational speed.

7. The method of claim 1, wherein the first setting is the maximum propeller rotational speed.

8. The method of claim 1, comprising determining that the power need is incompatible with the second setting for the propeller rotational speed when the position of the power lever is incompatible with a position of the cockpit input other than the position of the power lever.

9. The method of claim 1, wherein the cockpit input other than the position of the power lever includes a switch or a dial.

10. The method of claim 1, comprising determining that the power need is incompatible with the second setting for the propeller rotational speed when the first engine and the second engine are not operating at the same speed.

11. A system for operating an aircraft powerplant comprising an engine coupled to a variable-pitch propeller, the system comprising:
at least one processing unit; and
at least one non-transitory computer-readable memory having stored thereon program instructions executable by the processing unit for:
receiving, from a pilot of the aircraft, an input indicative of thrust demanded from the powerplant, the input including a position of a power lever;
operating the powerplant according to the input indicative of thrust demanded from the powerplant and according to a first setting for a propeller rotational speed;

receiving, from the pilot of the aircraft via a cockpit input other than the position of the power lever, a pilot request to change the propeller rotational speed from the first setting to a second setting while the powerplant is operated according to the input indicative of thrust demanded from the powerplant;

determining a power need for the engine based on the input indicative of thrust demanded from the powerplant;

determining whether the power need is compatible with the second setting for the propeller rotational speed;

when the power need is compatible with the second setting for the propeller rotational speed, modifying a command for at least one of fuel flow to the engine and oil flow to the propeller to govern the powerplant in accordance with the second setting for the propeller rotational speed; and when the power need is incompatible with the second setting for the propeller rotational speed, overriding the pilot request to change the propeller rotational speed from the first setting to the second setting by maintaining the first setting for the propeller rotational speed despite the pilot request to change the propeller rotational speed from the first setting to the second setting;

wherein:
the second setting for the propeller rotational speed is lower than a maximum propeller rotational speed;
the engine is a first engine and the variable-pitch propeller is a first variable-pitch propeller;
the aircraft has a twin engine configuration including a second engine coupled to a second variable-pitch propeller; and
the instructions are executable by the processing unit for:
when a failure of the second engine is detected while the powerplant is governed in accordance with the second setting for the propeller rotational speed, governing the powerplant in accordance with the maximum propeller rotational speed for the first variable-pitch propeller; and when the pilot selects take-off power through the power lever while the powerplant is governed in accordance with the second setting during cruise, causing, by a control system of the aircraft, the powerplant to be governed in accordance with the maximum propeller rotational speed for the first variable-pitch propeller.

12. The system of claim 11, wherein receiving the pilot request to change the propeller rotational speed comprises receiving the pilot request at a combined electronic propeller and engine control system.

13. The system of claim 11, wherein determining the power need for the engine comprises obtaining an engine status, and wherein the power need is incompatible with the second setting when the engine status is incompatible with governing the powerplant in accordance with the second setting for the propeller rotational speed.

14. The system of claim 11, wherein the power need is incompatible with the second setting when the position of the power lever is incompatible with governing the powerplant in accordance with the second setting for the propeller rotational speed.

15. The system of claim 11, wherein the program instructions are further executable by the processing unit for modifying the fuel flow to the engine to maintain engine power when the powerplant is governed in accordance with the second setting for the propeller rotational speed.

16. The system of claim 11, wherein the first setting is the maximum propeller rotational speed.

17. An aircraft powerplant comprising:
a gas turbine engine;
a variable-pitch propeller coupled to the gas turbine engine; and
a controller coupled to the gas turbine engine and the variable-pitch propeller and configured for:
receiving, from a pilot of the aircraft, an input indicative of thrust demanded from the powerplant, the input including a position of a power lever;
operating the powerplant according to the input indicative of thrust demanded from the powerplant and according to a first setting for a propeller rotational speed;
receiving, from the pilot of the aircraft via a cockpit input other than the position of the power lever, a pilot request to change the propeller rotational speed from the first setting to a second setting while the powerplant is operated according to the input indicative of thrust demanded from the powerplant;
determining a power need for the engine based on the input indicative of thrust demanded from the powerplant;
determining whether the power need is compatible with the second setting for the propeller rotational speed;
when the power need is compatible with the second setting for the propeller rotational speed, modifying a command for at least one of fuel flow to the engine and oil flow to the propeller to govern the powerplant in accordance with the second setting for the propeller rotational speed; and
when the power need is incompatible with the second setting for the propeller rotational speed, overriding the pilot request to change the propeller rotational speed from the first setting to the second setting by maintaining the first setting for the propeller rotational speed despite the pilot request to change the propeller rotational speed from the first setting to the second setting;
wherein:
the second setting for the propeller rotational speed is lower than a maximum propeller rotational speed;
the engine is a first engine and the variable-pitch propeller is a first variable-pitch propeller;
the aircraft has a twin engine configuration including a second engine coupled to a second variable-pitch propeller; and
the controller is configured for:
when a failure of the second engine is detected while the powerplant is governed in accordance with the second setting for the propeller rotational speed, governing the powerplant in accordance with the maximum propeller rotational speed for the first variable-pitch propeller; and
when the pilot selects take-off power through the power lever while the powerplant is governed in accordance with the second setting during cruise, causing, by a control system of the aircraft, the powerplant to be governed in accordance with the maximum propeller rotational speed for the first variable-pitch propeller.

* * * * *